US006654062B1

United States Patent
Numata et al.

(10) Patent No.: US 6,654,062 B1
(45) Date of Patent: Nov. 25, 2003

(54) ELECTRONIC CAMERA

(75) Inventors: Hajime Numata, Tokyo (JP); Yoshiyuki Kato, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/191,909

(22) Filed: Nov. 13, 1998

(30) Foreign Application Priority Data

Nov. 13, 1997 (JP) .............................. 9-329459
Dec. 26, 1997 (JP) .............................. 9-368705

(51) Int. Cl.⁷ .......................... H04N 5/235; G03B 7/00
(52) U.S. Cl. ...................... 348/362; 348/364; 348/370; 348/218.1; 348/221.1
(58) Field of Search ................................ 348/362, 364, 348/218.1, 221.1, 370, 371; 396/157, 159, 161, 164

(56) References Cited

U.S. PATENT DOCUMENTS

| 5,049,997 A | * | 9/1991 | Arai ............................ 348/364 |
| 5,051,766 A | * | 9/1991 | Nonaka et al. .............. 396/103 |
| 5,136,312 A | * | 8/1992 | Weaver et al. ............... 396/175 |
| 5,305,046 A | * | 4/1994 | Sato ............................ 396/123 |
| 5,406,391 A | * | 4/1995 | Takahashi ............... 250/214 B |
| 5,420,635 A | | 5/1995 | Konishi et al. .............. 348/362 |
| 5,621,462 A | * | 4/1997 | Takahashi et al. ........ 348/229.1 |
| 5,963,254 A | * | 10/1999 | Kim et al. .................... 348/363 |
| 5,966,175 A | * | 10/1999 | Inoue .......................... 348/363 |
| 5,969,761 A | * | 10/1999 | Takahashi et al. ........ 348/229.1 |
| 6,204,881 B1 | * | 3/2001 | Ikeda et al. .............. 348/229.1 |
| 6,426,775 B1 | * | 7/2002 | Kurokawa ................... 348/362 |
| 6,441,856 B1 | * | 8/2002 | Sugimoto .................... 348/371 |
| 6,570,620 B1 | * | 5/2003 | Yoshimura et al. ......... 348/362 |

FOREIGN PATENT DOCUMENTS

JP 5-64070 3/1993
JP 9-160103 6/1997

* cited by examiner

Primary Examiner—Andrew Christensen
Assistant Examiner—Eric Wisdahl
(74) Attorney, Agent, or Firm—Pennie & Edmonds LLP

(57) ABSTRACT

An electronic camera comprises a flash unit. When the electric camera takes a picture using the flash unit, the electronic camera determines a first optimum flash exposure for a central area of the object to be taken and a second optimum flash exposure for a background area of the object to be taken. Further, the camera produces first image data corresponding to a picture taken under the first optimum flash exposure and second image data corresponding to a picture taken under the second optimum flash exposure. The central area of the first image data is cut out from the first image data and written over the second image data.

23 Claims, 14 Drawing Sheets

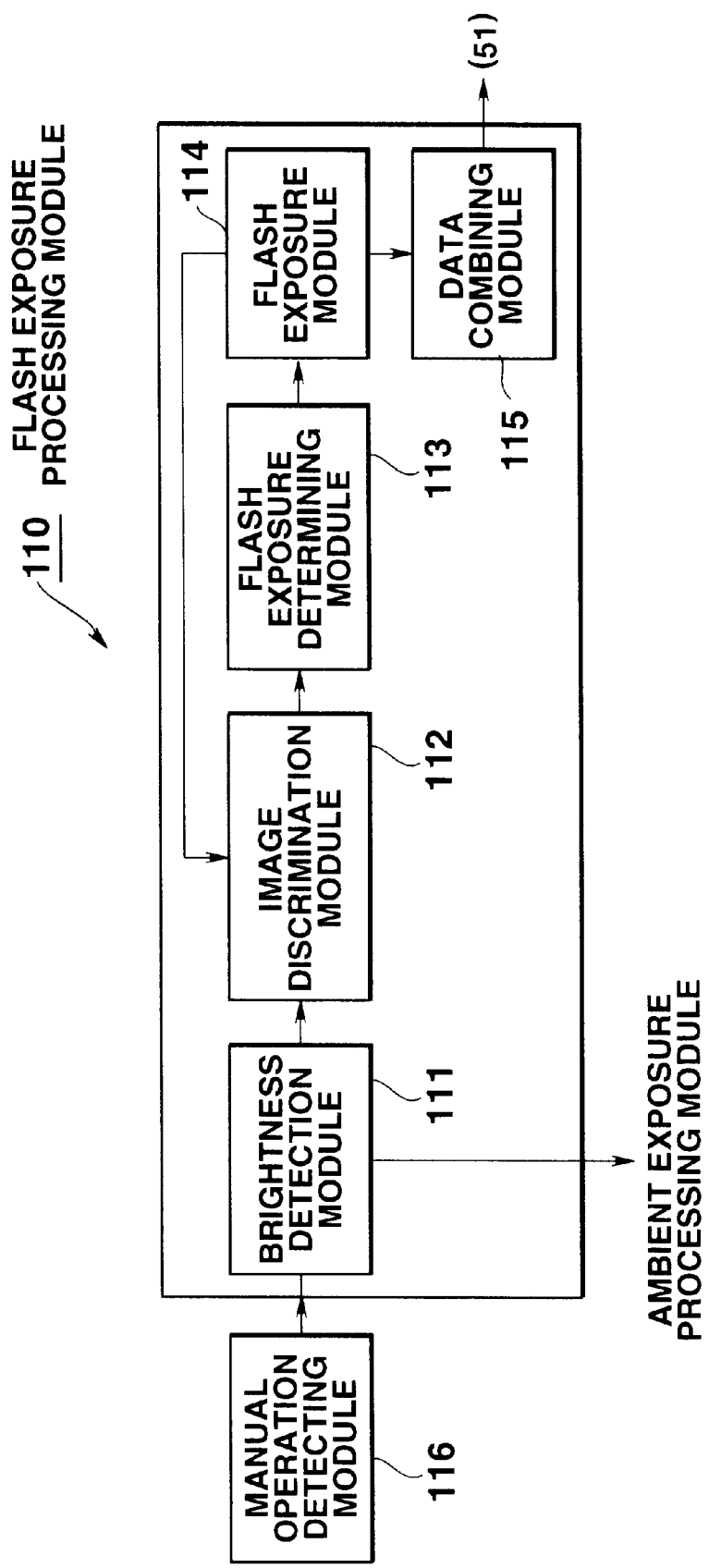

+

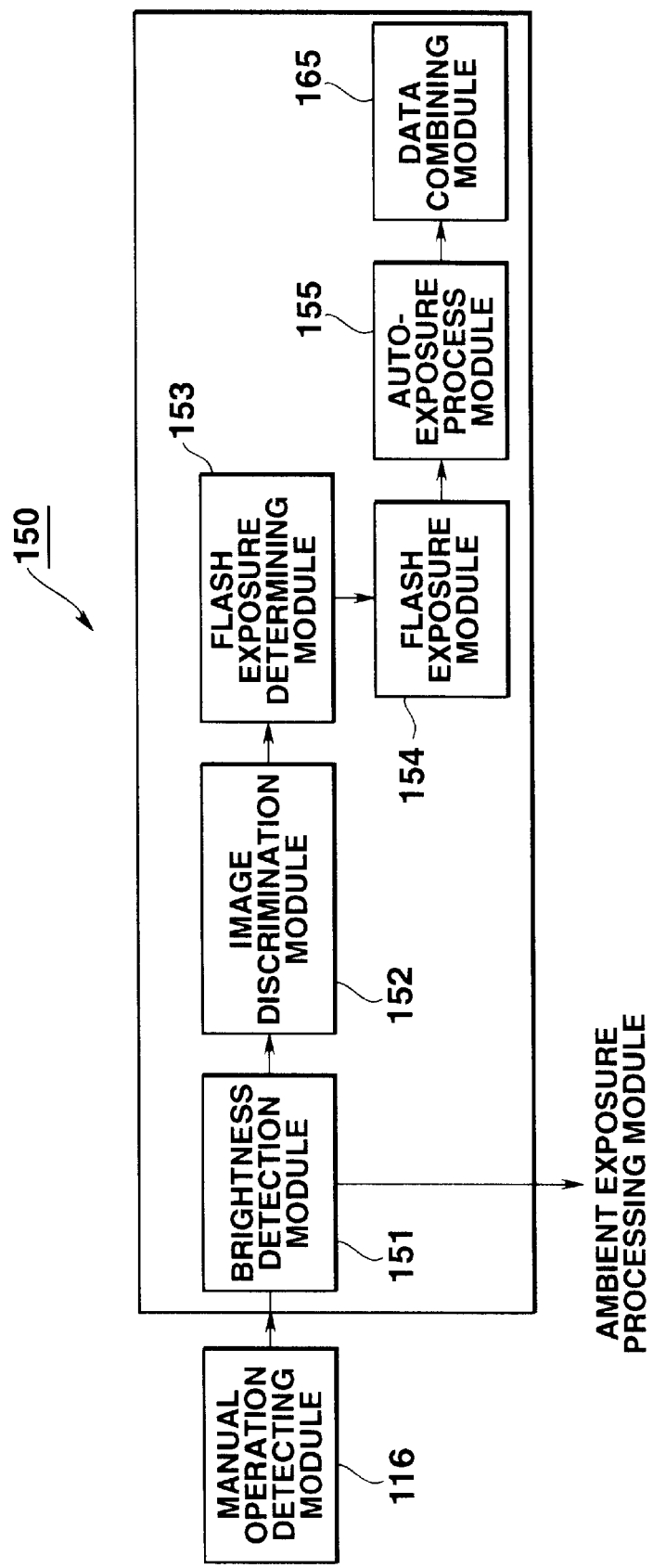

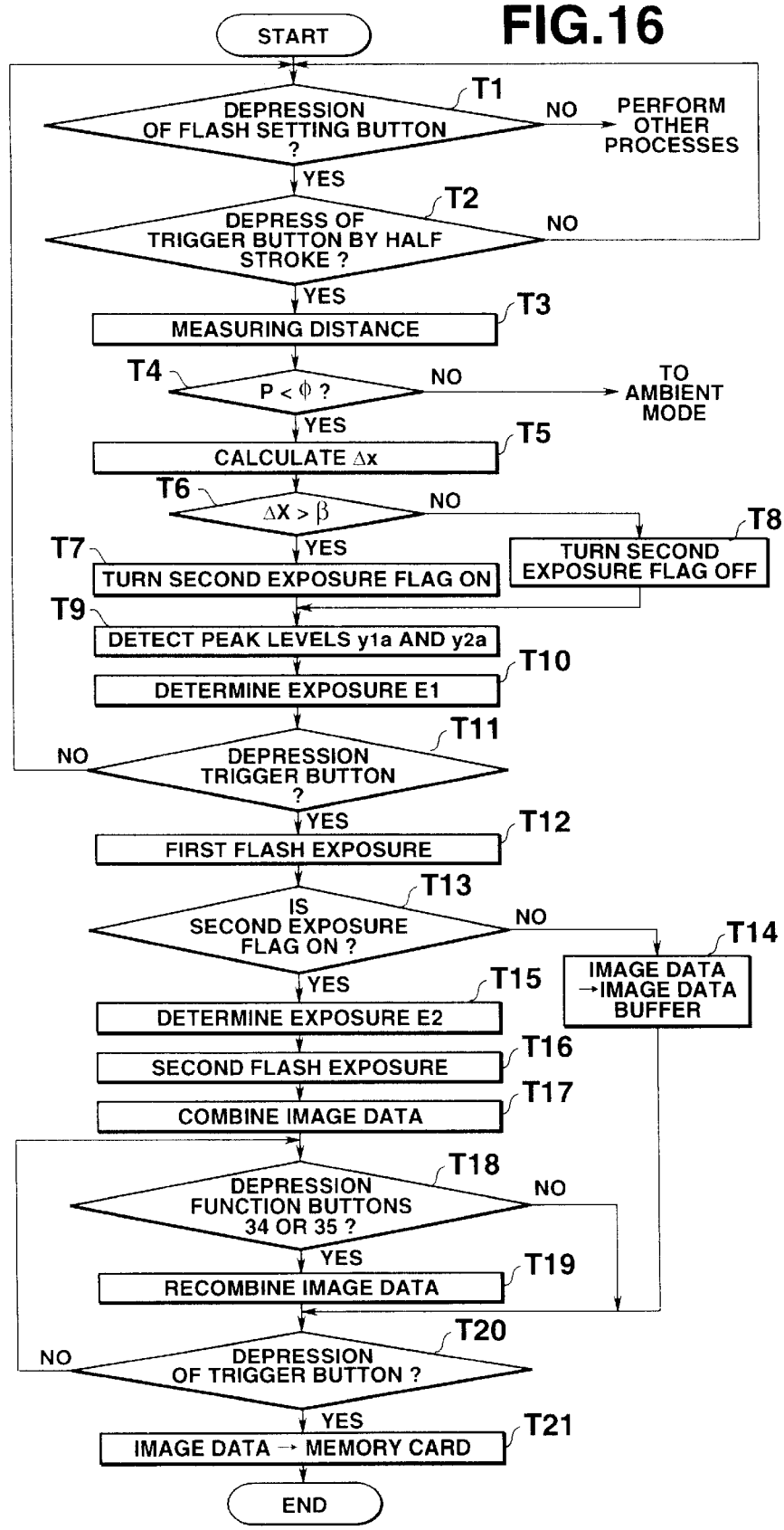

ELECTRONIC CAMERA

BACKGROUND OF THE INVENTION

1. Field of the Invention

The present invention relates to an electronic camera, such as a digital still camera, and more particularly to an electronic camera having a charge coupled device (CCD), which is capable of taking a picture with flash such that the exposure is correctly adjusted over the entire image area.

2. Description of the Prior Art

Recently, electronic cameras, such as digital still cameras, have been used both in place of conventional film cameras, and also for entering image data into a personal computer or other electronic device. Since the electronic camera has a CCD, which can vary its sensitivity and adjust to a higher sensitivity corresponding to the darkness of an object in the image, can take pictures at higher shutter speeds without flash even in low light situations. That is, since the CCD output signals are amplified by an amplifier with gain which is variable corresponding to ambient brightness, the camera does not have to employ the low shutter speeds, or use a flash unit, to the degree required with conventional cameras. However, when the gain of the amplifier is set too high, picture quality is degraded because noise in the CCD output signals is amplified with the same high gain. Therefore, even the electronic camera would be better to take a picture with flash so darker situation than that in which the quality of the picture cannot keep reasonably high without the flash.

For flash exposures, electronic cameras have the same problem as conventional film cameras: the flash exposure is determined by the combination of the flash power and the aperture of an iris diaphragm, adjusted for the distance from the flash unit to the object to be photographed. Thus when the image includes a central object and a background distant from the central object, the flash exposure cannot be adjusted correctly for both the central object and the background. When the flash exposure is adjusted to the central object, the background becomes unduly dark. Conversely, when the flash exposure is adjusted to the background, the central object becomes unduly bright.

SUMMARY OF THE INVENTION

Accordingly, the present invention provides an electronic camera capable of taking a flash picture in which the exposure is more correctly adjusted for the entire area, i.e. both a central area and a background.

This is achieved by an electronic camera for recording an image, comprising: image sensing means for providing electric signals representative of such image; exposure control means for logically dividing such image into plural areas and determining an optimum exposure for each such area; exposure means for exposing the image sensing means to each such area for the exposure determined by the exposure control means; data means for producing image data based on the electrical signals output from the image sensing means for each such optimum exposure; and means for combining the image data so produced into an overall resultant image.

The present invention also provides an electronic camera for recording an image, comprising: image sensing means for capturing such image and converting it to electric signals; first and second exposure control means for determining a first and second exposures, respectively, for first and second areas of such image; first and second exposure means for exposing the areas respectively to the image sensing means in accordance with the first and second exposures; image data means for producing first and second image data based on the electrical signals output from the image sensing means in response to the first and second exposures; and combining means for combining the first image data and the second image data into an overall resultant image.

BRIEF DESCRIPTION OF THE DRAWINGS

FIG. 5 is a diagram illustrating a structure of control program modules stored in a read only memory used in the digital camera shown in FIGS. 1A and 1B.

FIG. 9 is a diagram illustrating a structure of control program modules stored in a read only memory used in a digital camera in a second embodiment of the present invention.

FIG. 16 is a flow chart illustrating an operation in a flash mode of the digital camera in the forth embodiment.

DETAILED DESCRIPTION OF PREFERRED EMBODIMENTS OF THE INVENTION

[First Embodiment]

A first preferred embodiment of the invention will be described as follows.

Figure 1:
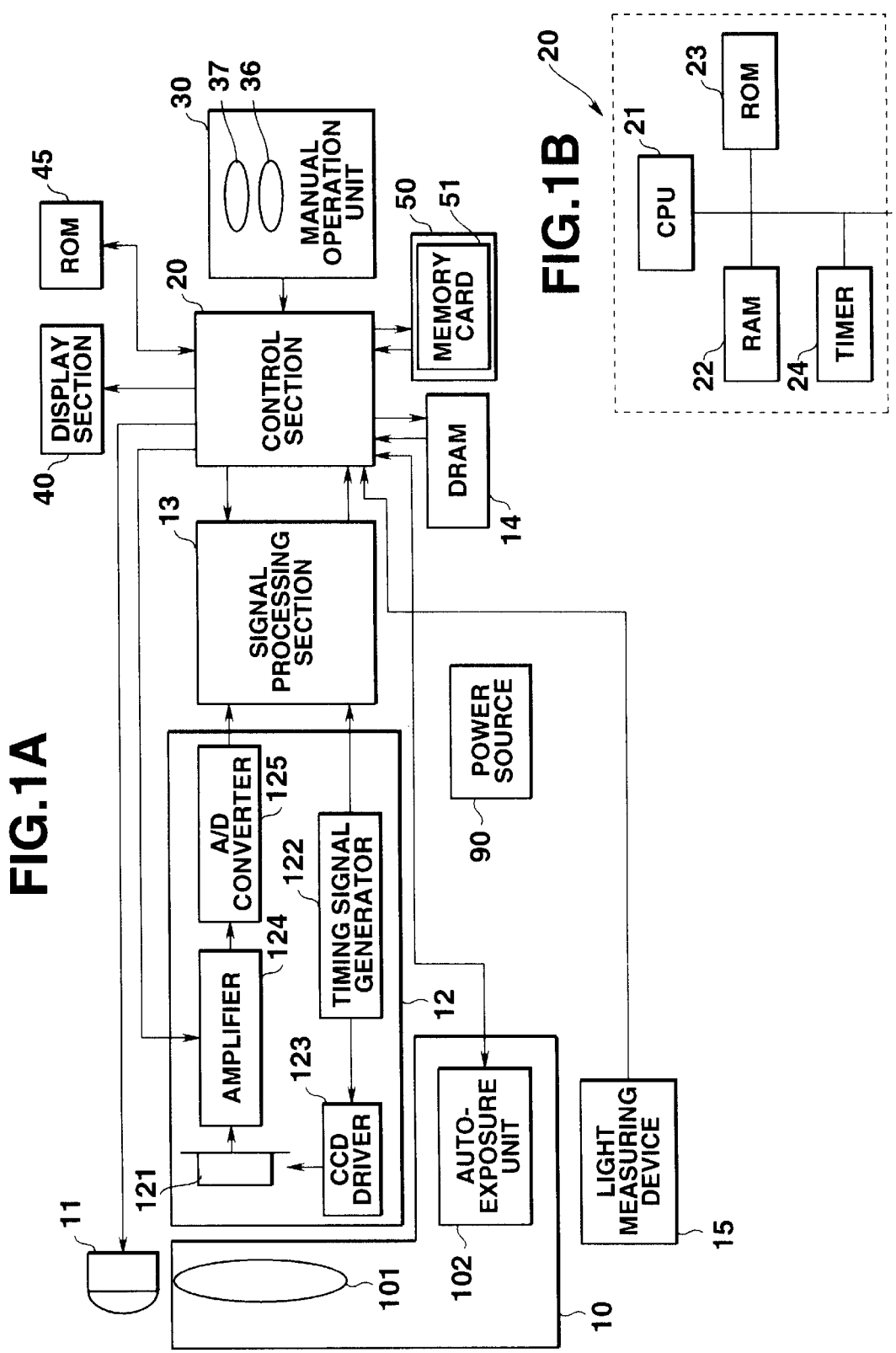
FIGS. 1A and 1B are block diagrams of a digital camera employing the present invention.

FIG. 1A is a block diagram of a digital camera in accordance with the invention. Digital camera 100 includes optical section 10, flash unit 11, signal conversion section 12, signal processing section 13, dynamic random access memory (DRAM) 14, light measuring device 15, control section 20, manual operation unit 30, display section 40, read only memory (ROM) 45, recording section 50 and power source 90.

Optical section 10 comprises optical lens 101 and auto-exposure unit 102. Optical lens 101 is mounted on the front surface of camera 100 and focuses an optical image on image sensing device 121, such as a charge coupled device (CCD), in signal conversion section 12. Auto-exposure unit 102 may include an iris diaphragm, a shutter and a control mechanism for controlling the aperture of the iris diaphragm and the shutter speed based on control signals provided from control section 20.

Figure 2:
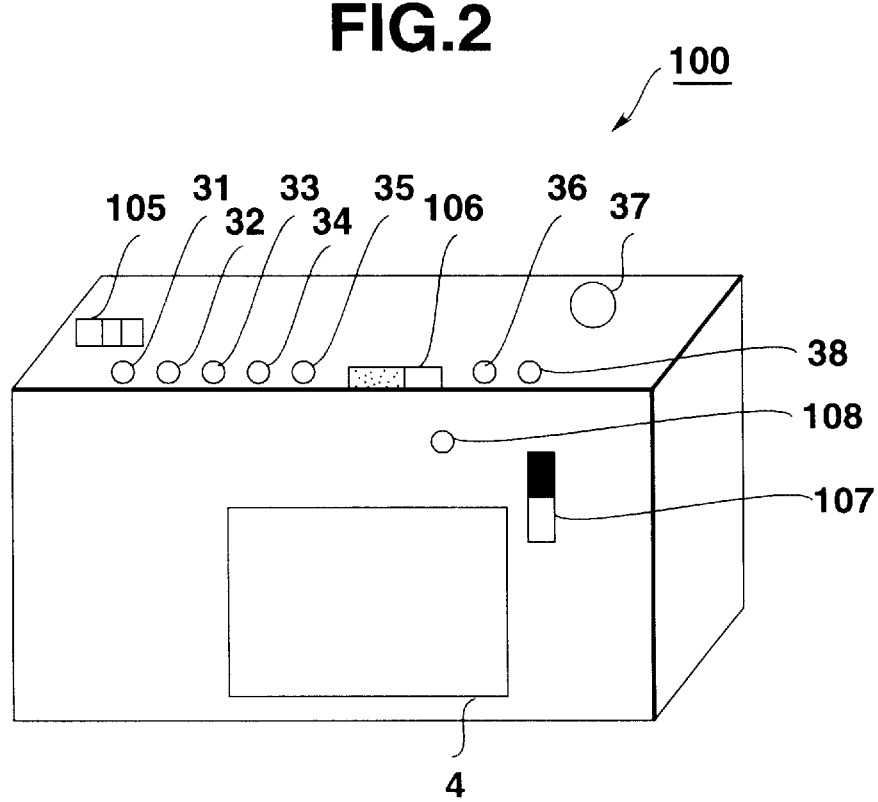
FIG. 2 is a perspective view of the digital camera shown in FIGS. 1A and 1B.

Flash unit 11 is charged with an electric charge from power source 90 and emits light to the image to be photographed. Flash unit 11 includes a control circuit for controlling flash power and duration in order to adjust the intensity of the flash. Flash unit 11 also includes pilot lamp 108 mounted on the rear surface of camera 100 as shown in FIG. 2, which indicates that flash unit 11 has been charged to emit the required light.

Light measuring device 15 mounted on the front surface of camera 100 measures reflected ambient light from the image to be recorded. Light measuring device 15 is directionally sensitive in order to measure the reflected ambient lighting at the center of the image to be recorded.

Signal conversion section 12 comprises CCD 121, timing signal generator 122, CCD driver 123, amplifier 124 and analog to digital converter (A/D) 125. Timing signal generator 122 generates timing signals and outputs the timing signals to CCD driver 123. CCD driver 123 controls CCD 121 based on the timing signals provided from timing signal generator 122. CCD 121 generates electrical signals corresponding to the optical image focused on it by optical section 10, and outputs these signals to amplifier 124 under control of CCD driver 123. The gain of amplifier 124 is variable and is controlled control section 20. Amplifier 124 amplifies the analog signals provided from CCD 121 with a certain gain determined by control section 20, and outputs the amplified signals to A/D converter 125. A/D converter 125 in turn converts the analog signals into digital signals.

Signal processing section 13 may include a color processing unit and a data compression unit. Signal processing section 13 performs color processing on the digital signals output from signal conversion section 12 and produces image data consisting of luminosity data and chromatic data. Signal processing section 13 provides the image data for DRAM 14 under control of a direct memory access controller (DMA) (not shown). Further, signal processing section 13 compresses the image data read out from DRAM 14 using a data compression algorithm, such as a Joint Photographic Expert Group (JPEG) algorithm, and provides the compressed image data to recording section 50. Signal processing section 13 decompresses the compressed image data read out from recording section 50 and provides the decompressed image data to DRAM 14.

Figure 3:
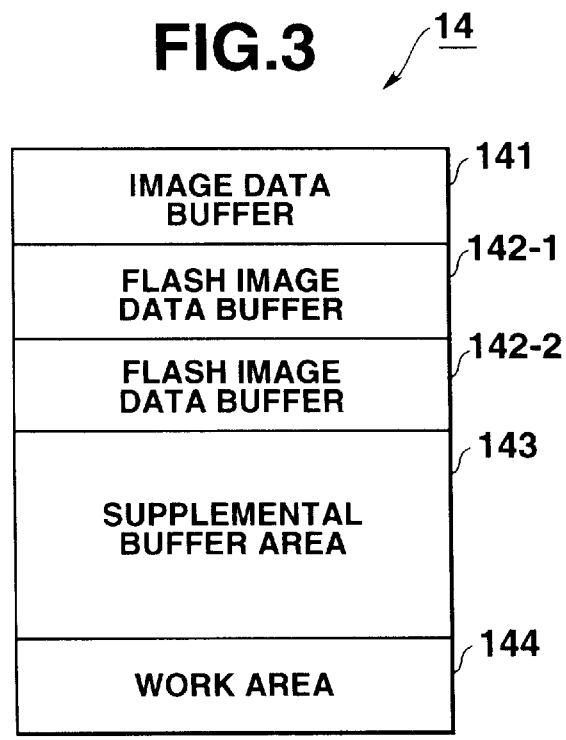
FIG. 3 is a diagram illustrating a layout of a dynamic random access memory used in the digital camera shown in FIGS. 1A and 1B.

DRAM 14 stores various image data to be processed by the data processing section. FIG. 3 shows one layout of DRAM 14, including an image data buffer 141, two flash image data buffers 142-1 and 142-2, supplemental buffer area 143 and work area 144. Image data buffer 141 stores the image data to be displayed, compressed, decompressed and processed for other purposes. Flash image data buffers 142-1 and 142-2 store the image data acquired using the flash unit 11.

Recording section 50 includes memory card which stores the compressed image data provided from the DRAM through signal processing section 13 under the control of the control section 20. Recording section 50 may include a flash memory or the like mounted on a stationary circuit board of camera 100 instead of memory card 51.

Display section 40 includes liquid crystal display (LCD) 4 mounted on the rear surface of camera 100 as shown in FIG. 2. Display section 40 is supplied with the image data stored in DRAM 14 and displays an image corresponding to the image data. Display section 40 is capable of serving a view finder to display an object image corresponding to the optical image focused on CCD 121 and as a monitor to display an image corresponding to the image data stored in memory card 51. Display section 40 is also supplied with display data stored in ROM 45 and displays various graphic object and characters on LCD 4 for indicating various information and status with respect to camera 100.

ROM 45 stores various graphic and character data to be displayed on LCD 4 for indicating the various information and status with respect to camera 100, such as status of a battery, a focus area, an operation mode, etc.

Manual operation unit 30, as shown in FIG. 2, includes mode switch 105, function buttons 31–35, power switch 106, flash mode setting button 36, trigger button 37, output button 38 and record/play (REC/PLAY) switch, 107. Mode switch 105, function buttons 31–35, power switch 106, flash setting button 36 and trigger button 37 are mounted on the upper surface of camera 100. REC/PLAY switch 107 is mounted on the rear surface of camera 100. Manual operation unit 30 outputs signals to control section 20 in response to operation and/or status of buttons 31–38 and switches 106–107.

Control section 20 may include central processing unit (CPU) 21, random access memory (PAM) 22, read only memory (ROM) 23 and timer 24, as shown in FIG. 1B. CPU 21 controls all processes of camera 100 in order to perform its function based on various control program modules stored in ROM 23 and the input signals supplied from manual operation unit 30. ROM 23 stores the various program modules including manual operation detecting module 116 and flash exposure processing module 110 as shown in FIG. 5. ROM 23 may include a programmable read only memory (PROM) or a flash read only memory (FROM), and stores control programs for controlling the various functions of camera 100, which are described in detail later. The control program modules may be stored in a removable memory medium including a flash memory as well as in ROM 23. RAM 22 is used as a work area for temporarily storing various data to be processed by CPU 21.

The operation of camera 100 will be described as follows.

Figure 4:
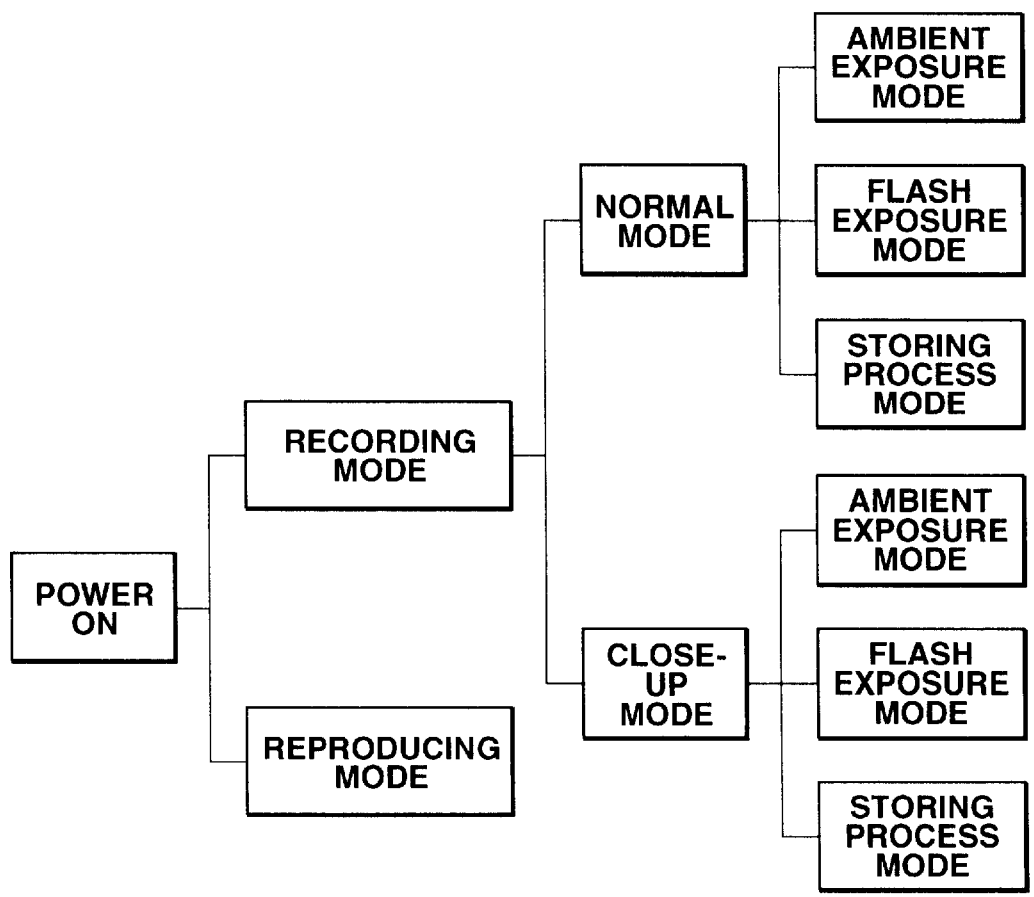
FIG. 4 is a diagram illustrating operation modes of the digital camera shown in FIGS. 1A and 1B.

Camera 100 operates in various process modes as shown in FIG. 4, under the control of control section 20.

First, when camera 100 is turned on by power switch 106, the control section 20 initializes all circuits of camera 100 and performs manual operation detecting module 116 to detect a position of REC/PLAY switch 107. REC/PLAY switch 107 puts camera 100 into either a recording mode or a reproducing mode. When REC/PLAY switch 107 is at a REC position, camera 100 operates in a recording mode. In the recording mode, control section 20 detects a position of mode switch 105. Mode switch 105 puts camera 100 into either a normal mode for taking a normal picture or a close-up mode for taking a close-up picture. When mode switch 105 is at a close-up mode position, control section 20 controls optical section 10 in order to take a close-up picture.

[Ambient Exposure Mode]

In both the normal mode and the close-up mode, camera 100 operates in an ambient exposure mode unless flash setting button 36 is depressed. In the ambient mode, an object image corresponding to an optical image focused on CCD 121 is displayed on LCD 14 under the control of control section 20. In this case, signal conversion section 12 outputs the digital signals corresponding to the optical image focused on CCD 121 at intervals of a predetermined period of time under the control of control section 20. Amplifier 124 is set predetermined gain by control section 20. Signal processing section 13 produces image data based on the digital signals and provides the image data for image data buffer 141 of DRAM 14 every time digital signals is provided from signal conversion section 12. Control section 20 provides display section 40 with the image data which is stored in image data buffer 141 in order to display the object image on LCD 14. Further, control section 20 reads out the brightness data from light measuring device 15 and computes optimum combination between the aperture of the iris diaphragm and the shutter speed of the shutter based on the brightness data obtained by light measuring device 15 in accordance with an exposure control program module (not shown) stored in ROM 23. Auto-exposure unit 102 is provided control data representing the optimum combination between the aperture and the shutter speed from control section 20. When trigger button 37 is depressed by a half position of its depression stroke, control section 20 controls optical unit 10 in order to adjust the focus. When trigger button 37 is fully depressed, control section 20 initializes signal conversion section 12 and starts the ambient exposure process for an optical image focused on CCD 121 so that CCD 121 picks up the optical image captured by optical unit 101 at the moment of the depression of trigger button 37. Since the shutter has been kept open when the trigger switch 37 is depressed, CCD 121 starts charging electric charge under the control of CCD driver 123. CCD 121 continues charging the electric charge corresponding to the optical image until the shutter is closed and provide the electric signals corresponding to the electric charge for amplifier 124. Amplifier 124 amplifies the electric signals with the predetermined gain set by the control section 20 and provided the amplified electric signals to A/D converter 125. A/D converter 125 converts the electric signals into digital signals and provides the digital signals to signal processing section 13. Signal processing section 13 produces the image data consisting of the luminosity data and chromatic data and provides the image data for image data buffer 141 of DRAM 14.

[Storing Process Mode]

After the above process, control section 20 automatically puts camera 100 in a storing process mode. In the storing process mode, control section 20 reads out the image data stored in image data buffer 141 and provides the image data for signal processing section 13. Signal processing section 13 performs the compression process on the image data. The compressed image data produced by signal processing section 13 is stored in memory card 51 under the control of control section 20. Control section 20 automatically puts camera 100 in the ambient exposure mode again.

[Flash Exposure Mode]

Figure 7:
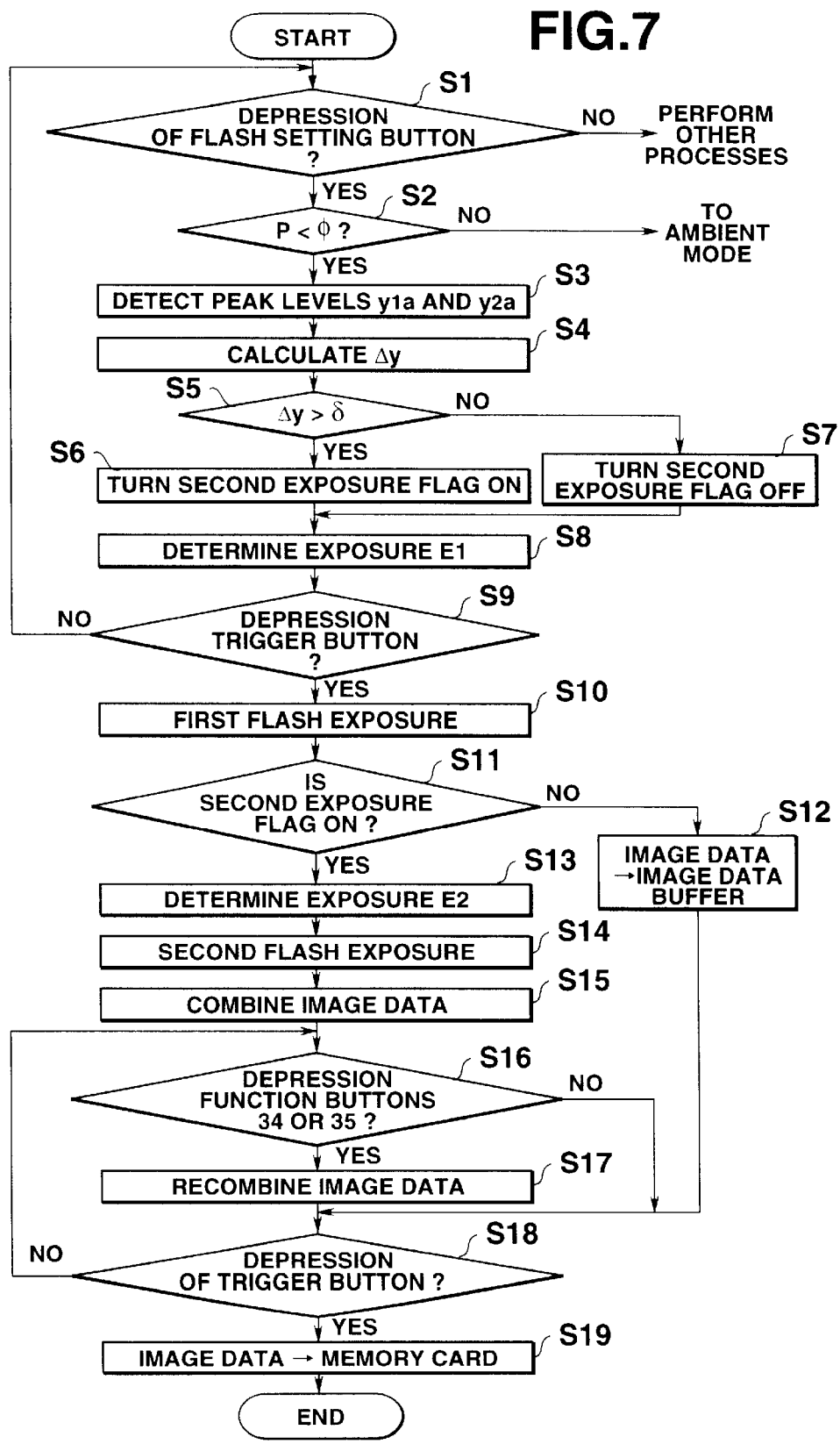
FIG. 7 is a flow chart illustrating an operation in a flash mode of the digital camera shown in FIGS. 1A and 1B.

FIG. 7 is a flow chart for illustrating the operation of camera 100 in the flash mode.

Figure 6A:
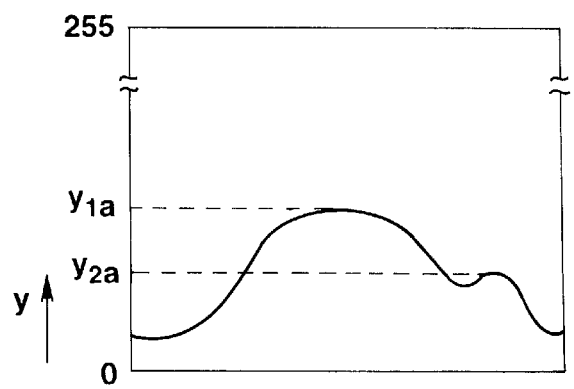
FIGS. 6A–6C are diagrams illustrating a distribution map representing distribution of brightness of image data.
Figure 8A:
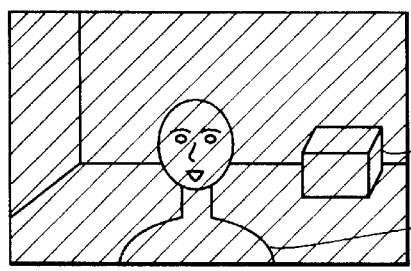
FIGS. 8A–8E are diagrams illustrating an object being taken by the digital camera shown in FIGS. 1A and 1B.
Figure 8B:
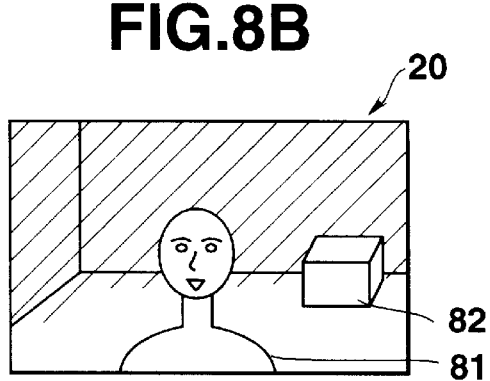

In the ambient exposure mode, when control section 20 detects the depression of flash setting button 36 (Step S1), control section 20 puts camera 100 in a flash exposure mode. Control section 20 turns flash unit 11 on. Flash unit 11 turns pilot lamp 108 on in red and is charged the electric charge by power source 90. When flash unit 11 has been charged the electric charge enough to emit the light, pilot lamp 108 is turned in green. In step S2, control section 20 performs brightness detection module 111 of flash exposure process module 110. Control section 20 reads out the brightness data P from light measuring device 15 and compares the brightness data P with a minimum brightness value $\phi$. The minimum brightness value $\phi$ represents the minimum brightness with which camera 100 can take a picture at a predetermined shutter speed without flash unit 11. When the brightness data P is grater than the minimum brightness value $\phi$, control section 20 automatically turns camera 100 into the ambient mode. When the brightness data P is smaller than the minimum brightness value $\phi$, control section 20 increases the gain of amplifier 124 so that LCD 4 can display the object image with visible brightness. When camera 100 captures an object shown in FIG. 8A. LCD 4 displays the object image shown in FIG. 8B. The image data corresponding to the object image shown in FIG. 8B is stored in image data buffer 141 of DRAM 14. In steps S3–S7, control section 20 performs image discrimination module 112 shown in FIG. 5. Control section 20 produces a distribution map shown in FIG. 6A, which represents distribution of the brightness in the image data stored in image data buffer 141 based on the luminosity data of the image data. Further, control section 20 obtains a central peak level y1a representing the brightest value of a central area of the object image and a background peak level y2a representing the brightest value of a background area of the object image (Step S3). The central area may correspond to a auto-focus area for adjusting the focus of lens 121. Control section 20 calculates a different value $\Delta y$ between the central peak level y1a and the background peak level y2a (Step S4). Further, control section 20 compares the different value $\Delta y$ with a predetermined value $\delta$ (Step S5). When the different value $\Delta y$ is grater than the predetermined value $\delta$ (Step S5), a second exposure flag in RAM 22 is turned on (Step S6). In this case, the second exposure flag in on-state indicates that two pictures to be combined will be taken. That is, when the central area of the object image is brighter than the background area by quite contrast, control section 20 determines that two pictures to be combined will be taken. When the different value $\Delta y$ is smaller than the predetermined value $\delta$, the second exposure flag is turned off (Step S7). The second exposure flag in the off-state indicates that only one picture will be taken. That is, when the central area of the object image is slightly brighter or darker than the background area, control section 20 determines that only one picture will be taken. This embodiment is particularly suitable for an indoor shot in relative lower light situation. Therefore, control section 20 presumes that an object in the background area is close to an object in the central area when the central area of the object image is slightly brighter than the background area. In this case, the light of flash unit 11 which is adjusted for the central area can cover the background area.

Figure 8C:
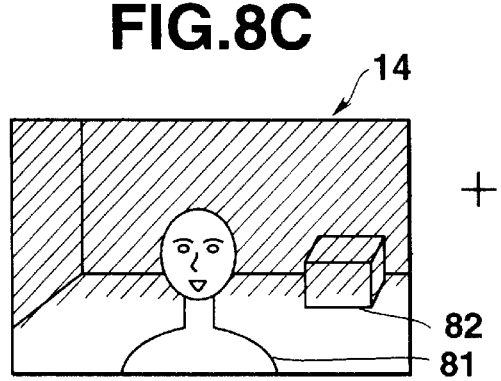

In step S8, control section 20 performs flash exposure determining module 113 shown in FIG. 5. Control section 20 computes an optimum flash exposure E1 for the central area of the object image based on the central peak level y1a and the brightness data P obtained by brightness measuring device 15. Auto-exposure unit 102 adjusts the aperture of the iris diaphragm and sets the shutter speed according to the optimum exposure E1 computed by control section 20. Flash unit 11 also sets the flash power and duration according to the optimum exposure El. Further, the gain of amplifier 124 is set certain value according to the optimum exposure E1. Control section 20 repeatedly performs the above operations of steps S1––S8 until trigger button 37 is depressed (Step S9). When trigger button 37 is depressed (Step S9), control section 20 performs a flash exposure module 114 in order to take a picture with using flash unit 11 (Step S10). In step S10, flash unit 11 emits the light for the preset flash duration with the preset flash power based on the control signal provided from control section 20. CCD 121 produces electric signals corresponding to the optical image supplemented by the light emitted by flash unit 11 and outputs the electric signals to amplifier 124. Amplifier 124 amplifies the electric signals provided from CCD 121 with the preset gain. The amplified electric signals are converted into the image data in the same manner as that in the ambient image mode. The image data is stored in first flash image data buffer 142-1. FIG. 8C shows the object image corresponding to the image data stored in first flash image data buffer 142-1. The object image shown in FIG. 8C includes the central area which is taken with the optimum exposure and the background area which is taken with an under exposure.

Figure 6B:
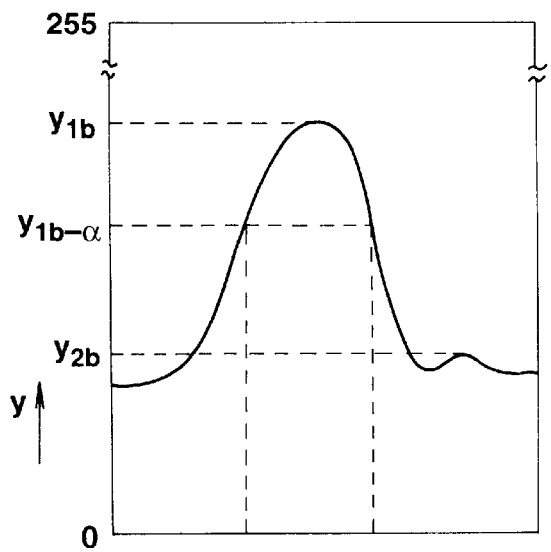
Figure 6C:
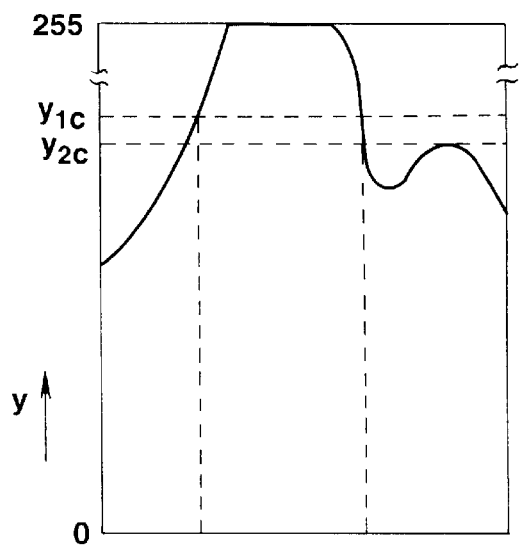
Figure 8D:
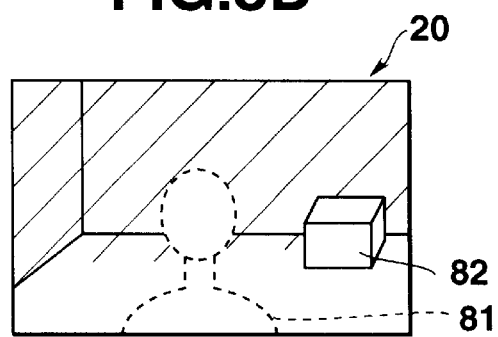
Figure 8E:
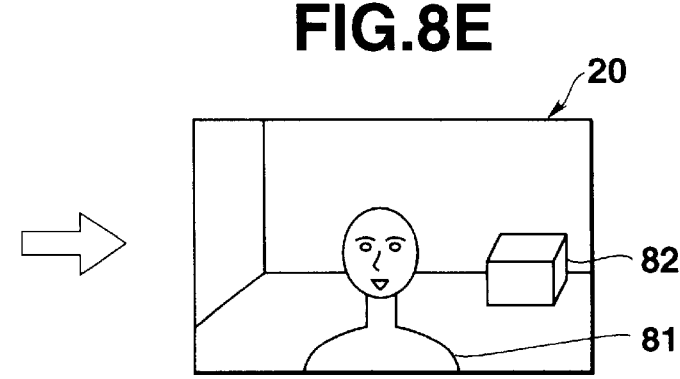

In step S11, control section 20 detects whether the second exposure flag is on. When the second exposure flag is off, the image data stored in first flash image data buffer 142-1 is transferred to image data buffer 141 (Step S12). When the second exposure flag is on, control section 20 performs flash exposure determining module 113. Control section 20 produces the distribution map shown in FIG. 6B which represents a distribution of the brightness in the image data stored in first flash image data buffer 142-1. Control section 20 obtains a central peak level y1$b$ and a background peak level y2$b$ from the distribution map. Further, control section 20 calculates a difference value $\Delta y2$ between the background peak levels y2$a$ and y2$b$ and then computes a second optimum flash exposure E2 for the background area of the object image based on relation between the difference value $\Delta y2$ and the first exposure value E1. Auto-exposure unit 102 adjusts the aperture of the iris diaphragm and sets the shutter speed according to the second optimum flash exposure E2 computed by control section 20. Flash unit 11 also sets the flash power and duration according to the second optimum exposure E2. Further, the gain of amplifier 124 is set certain value according to the second optimum exposure E2. In this case, the second optimum exposure E2 for the background area may be determined so that the maximum brightness of the background area will be the brightness calculated by subtracting a predetermined value $\alpha$ form the central peak level y1$b$ of the image data stored in first flash image data buffer 142-1. Thereafter, control section 20 performs an operation of second flash exposure (Step S14). In step S14, flash unit 11 emits the light for the preset flash duration with the preset flash power based on the control signal provided from control section 20. Amplifier 124 amplifies the electric signals output from CCD 121 with the preset gain. The amplified electric signals are converted into the image data in the same manner as that in the ambient mode. The image data is stored in second flash image data buffer 142-2. FIG. 8D shows the object image corresponding to the image data stored in second flash image data buffer 142-2. The object image shown in FIG. 8D includes the central area which is taken with an over exposure and the background area which is taken with the optimum exposure. FIG. 6C shows a distribution map of the image data stored in second flash image data buffer 142-2. In steps S15–S17 control section 20 performs data combining module 115 for combining the image data stored in first flash image data buffer 142-1 and second flash image data buffer 142-2. In step S15, control section 20 transfers the image data stored in second flash image data buffer 142-2 to image data buffer 141. Further, control section 20 cuts out image data which is brighter than (y1$b$-$\alpha$) from the image data stored in fist flash image data buffer 142-1, and over-writes the cut-out image data into image data buffer 141. That is, the image data in central area which is taken with the optimal exposure E1 is written over the another image data in the background area which is taken with the optimal exposure E2. FIG. 8E shows the combined image data stored in image data buffer 141. When the function buttons 34 or 35 is depressed (Step S16), control section 20 changes a value $\alpha$ to a smaller value or a grater value and performs the operation for combining the image data stored in first and second flash image data buffer 142-1 and 142-2 (Step S17). That is, when function button 34 is depressed, the image data central area to be combined is smaller. When function button 35 is depressed, the image data in the central area to be combined is lager.

[Storing Process Mode]

When the trigger button 37 is depressed (Step S18), control section 20 puts camera 100 in the storing process mode (Step S19). In the storing process mode, the image data stored in the image data buffer 141 is compressed by signal processing section 13. The compressed image data is stored in memory card 51.

In the above embodiment, the operation for determining whether or not the second picture has to be taken is performed in Steps S3–S7. This operation, however, may be performed in Step S13. When this operation is performed in Step S13, control section 20 performs the same operation as that in steps S3–S7 on a distribution map shown in FIG. 6B which represents distribution of brightness in the image data stored in first flash image data buffer 142-1.

According to above embodiment, although camera 100 takes two pictures in the flash mode, camera 100 may take three or more pictures. In this case, DRAM 14 is provided with three or more flash lighted image data buffers.

Further, to take a picture with an optimum exposure in the above embodiment, flash unit 11, auto-exposure unit 102 and amplifier 124 are controlled. However, only flash power and/or flash duration of flash unit 11 may be varied according to the optimum exposure.

[Reproducing Mode]

When control section 20 detects that REC/PLAY switch 107 is turns to a reproducing position, control section 20 operates in a reproducing mode. In the reproducing mode, control section 20 reads out the image data from memory card 51 and provides the image data for signal processing section 13. Signal processing section 13 decompresses the image data. The decompressed image data is provided for display section 40 for displaying the image on LCD 4 corresponding to the image data. When function buttons 31 or 32 are depressed, control section 20 performs the operation for the reproducing process on another image data stored in the memory card 51. When output button 38 is depressed, control section 20 outputs the image data stored in the memory card 51 to a data processing apparatus, such as a personal computer, though an interface.

[Second Embodiment]

A camera in accordance with a second embodiment performs the same operation as the first embodiment except an operation in the flash mode.

In the flash mode the camera takes one picture with flash exposure and another one picture with ambient exposure when the trigger button 37 is depressed once. Thereafter, two pictures which have been taken are combined.

Figure 11:
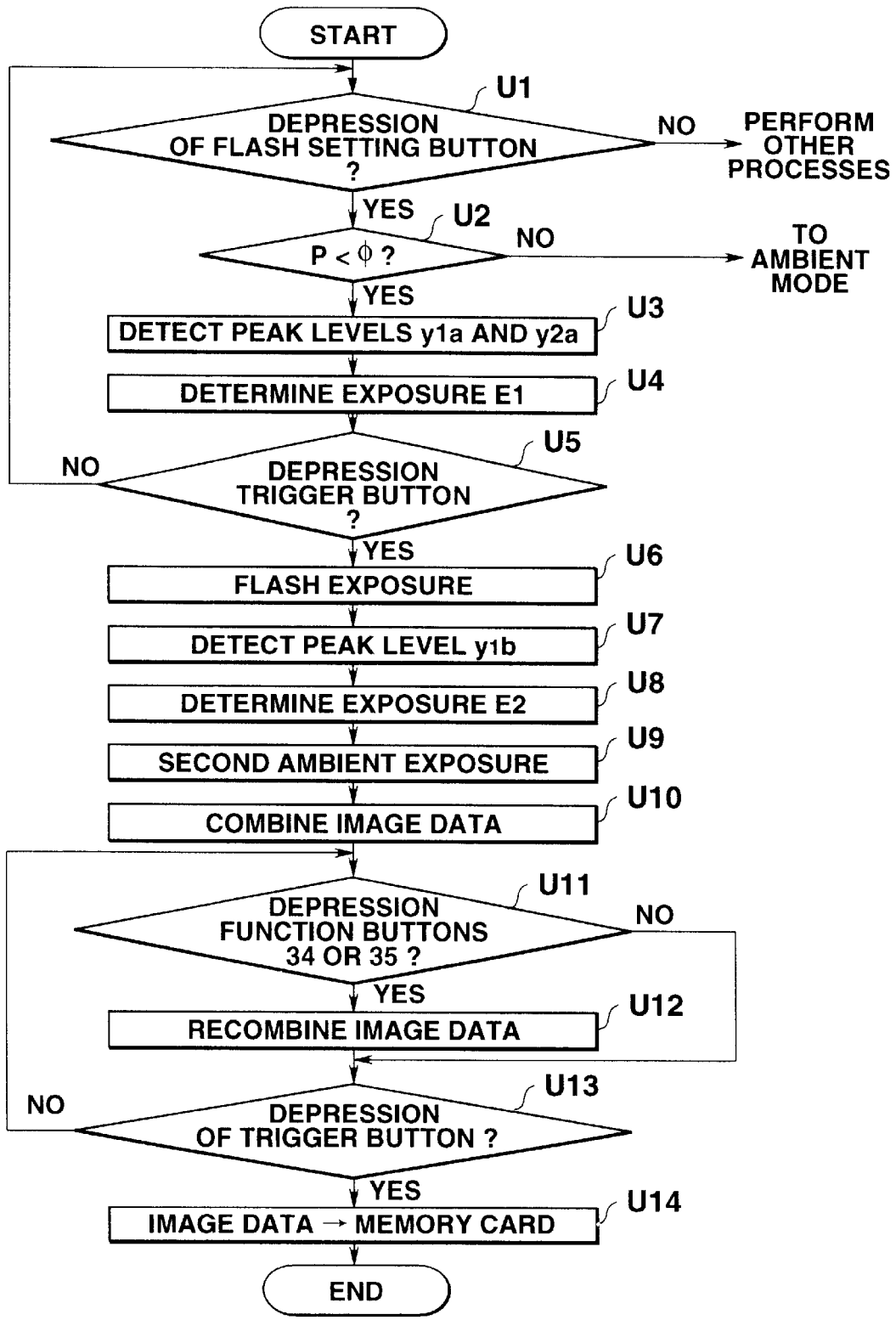
FIG. 11 is a flow chart illustrating an operation in a flash mode of the digital camera in the second embodiment.

FIG. 11 shows a flow chart for illustrating the operation of the camera in accordance with the second embodiment. FIG. 9 shows a diagram for illustrating a structure of program modules stored in ROM 23.

Figure 10A:
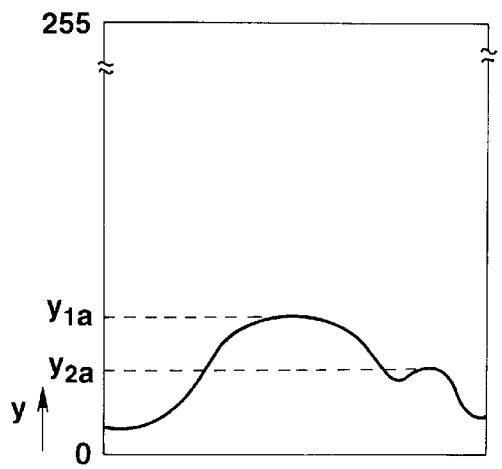
FIGS. 10A–10D are diagrams illustrating a distribution map representing distribution of brightness of image data.
Figure 10B:
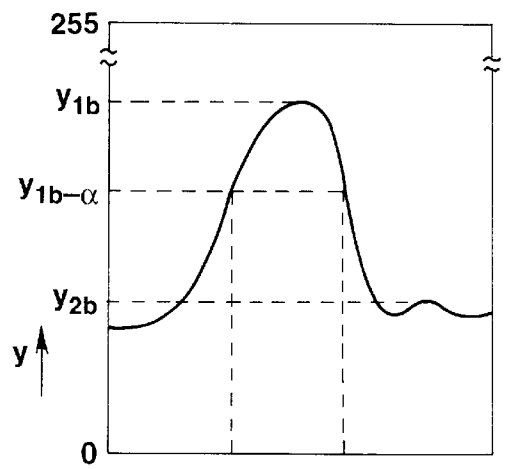
Figure 10C:
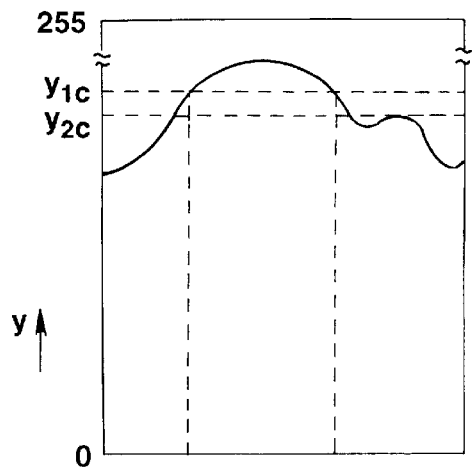
Figure 10D:
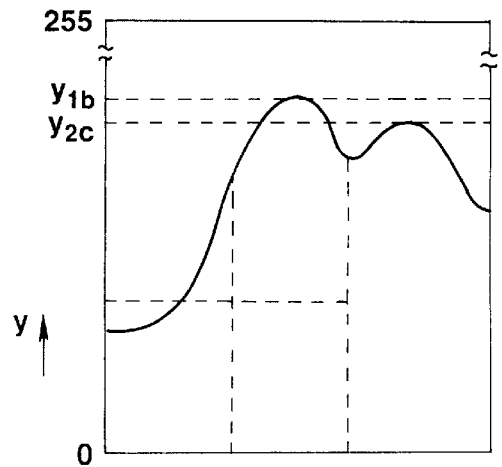

Steps U1–U3 are the same operation as steps S1–S3 in FIG. 7. In step U3, control section 20 produces a distribution map shown in FIG. 10A, and obtains a central peak level y1$a$ and a background peak level y2$a$ in the same manner as step S3. In Step U4, control section 20 computes first optimum flash exposure E1 for the central area in the same manner as step S8. When the trigger button 37 is depressed (Step U5), control section 20 performs the operation for taking a picture using flash unit 11 and stored the image data in flash image data buffer 142-1 (Step U6). In steps U7 and U8, control section 20 performs auto-exposure process module 155. In step U7, control section 20 produces a distribution map shown in FIG. 10B and obtains a central peak level y1b. Further, control section 20 computes second optimum ambient exposure E2 for the background area without the use of flash unit 11 based on the central peak level y1b and the background peak level y2a (Step U8). The second optimum exposure E2 for the background area is determined so that the maximum brightness of the background area will be the brightness calculated by subtracting a predetermined value α form the central peak level y1b of the image data stored in first flash image data buffer 142-1. Control section 20 controls auto-exposure unit 102 according to the second optimum ambient exposure E2. Auto-exposure unit 102 sets the aperture of the iris diaphragm and the shutter speed according to the second optimum ambient exposure E2. Control section 20 also sets a predetermined gain to amplifier 124 and stops the operation of flash unit 11. Thereafter, control section 20 performs the operation for taking a picture with the second optimum exposure E2 (Step U9). The electric signals produced by CCD 121 are converted into the image data. The image data is stored in image data buffer 141 (Step U10). FIG. 10C shows a brightness distribution map of the image data stored in image data buffer 141. In step U11, control section 20 cuts out image data which is brighter than (y1b-α) from the image data stored in first flash-image data buffer 142-1 and over-writes the cut-out part into the image data stored in image data buffer 141. FIG. 10D shows a brightness distribution map of combined image data which the cut-out part is over-written into the image data stored in image data buffer. Further, control section 20 performs the same operation in steps U11–U14 as steps S16–S19, and then finally stores the combined image data in memory card 51 in step U14.

[Third Embodiment]

Figure 12:
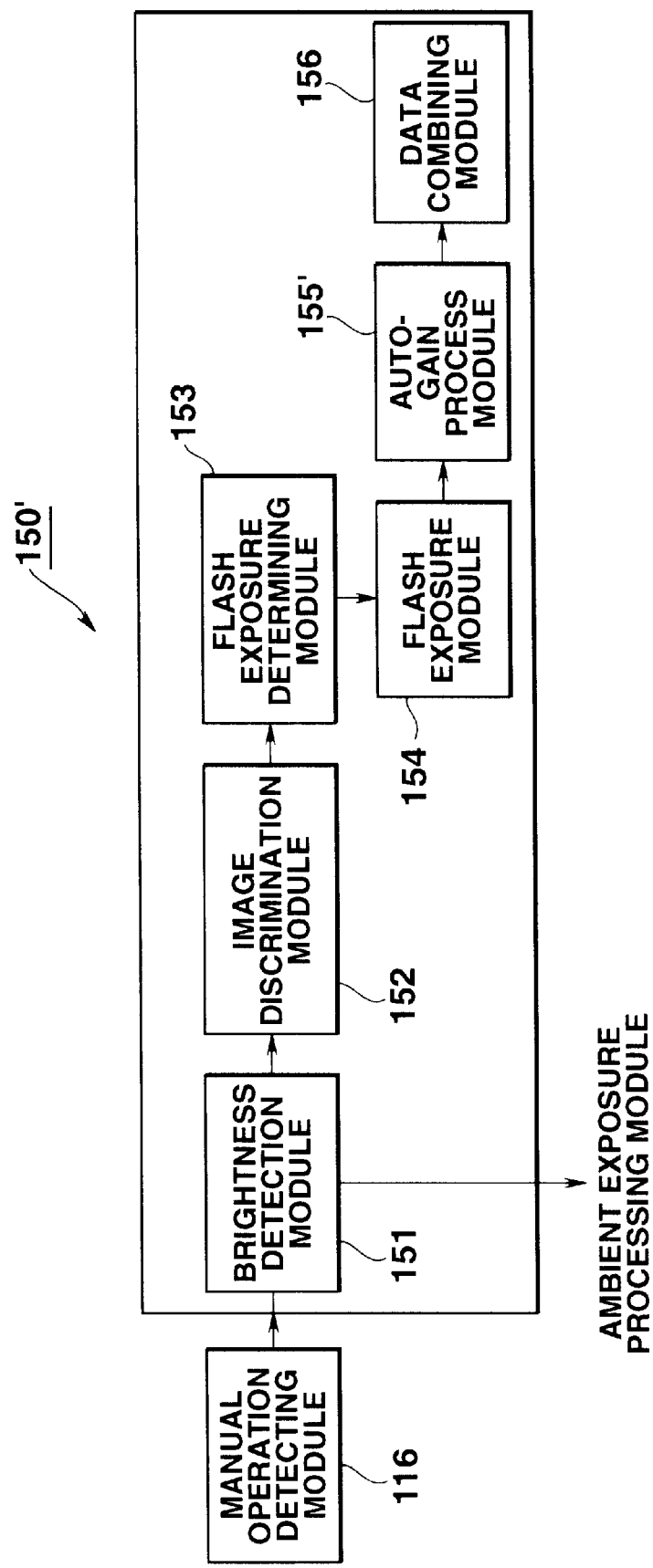
FIG. 12 is a diagram illustrating a structure of control program modules stored in a read only memory used in a digital camera in a third embodiment of the present invention.

A camera in accordance to a third embodiment performs the same operation as the second embodiment except an operation in the steps U8 and U9. As shown in FIG. 12, ROM 23 stores auto-gain process module 155' instead of the auto-exposure precess module 155. Control section 20 set gain of amplifier 124 according to the second optimum ambient exposure E2. On the other hand, auto-exposure unit 102 sets a predetermined aperture of the iris diaphragm and a shutter speed.

[Forth Embodiment]

A camera in accordance with a forth embodiment employs an auto-focus unit which is capable of measure distance between the camera and an object to be taken.

Figure 13:
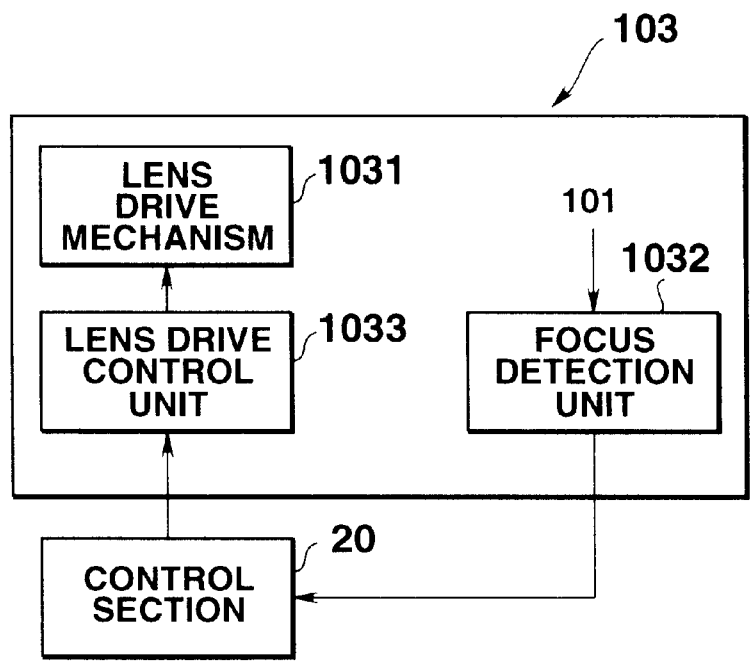
FIG. 13 is a block diagram of auto-focus unit used in a digital camera in a forth embodiment of the present invention.
Figure 14:
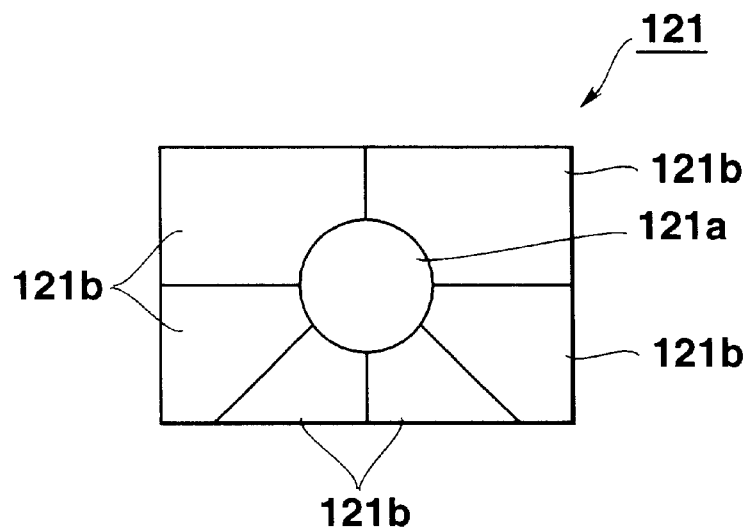
FIG. 14 is a diagram illustrating a charge couple device used in the digital camera in the forth embodiment.

FIG. 13 shows a block diagram of the auto focus unit 103. Auto-focus unit 103 includes lens drive mechanism 1031, focus detection unit 1032 and lens drive control unit 1033. Lens drive mechanism 1031 moves optical lens 101 between an infinity focus position and a closest focus position of optical lens 101 under the control of lens drive control unit 1033. Lens drive control unit 1033 controls lens drive mechanism 1031 so that optical lens 101 moves from the infinity focus position to the closest focus position. Lens drive control unit 1033 also controls lens drive mechanism 1031 so that optical lens 101 moves to a given position according to the control data provided from control section 20. Further, lens drive control unit 1033 provides a lens position data for focus detection unit 1032. Focus detection unit 1032 couples to CCD 121. Focus detection unit 1032 logically divides a photo-sensing area of CCD 121 into a plurality of focus areas as shown in FIG. 14 and detects whether an object in each focus area is in focus during optical lens 101 is moving from the infinity focus position to the closest focus position. Further, focus detection unit 1032 calculates distance between the camera and the object in each focus area form the lens position at which the object in each focus area is focused, and then provides the lens position data and the distance data representing the calculated distance for control section 20.

The operation of the camera will be described as follows. The camera substantially performs the same operation as the camera in accordance with the first embodiment except in the flash mode.

Figure 15:
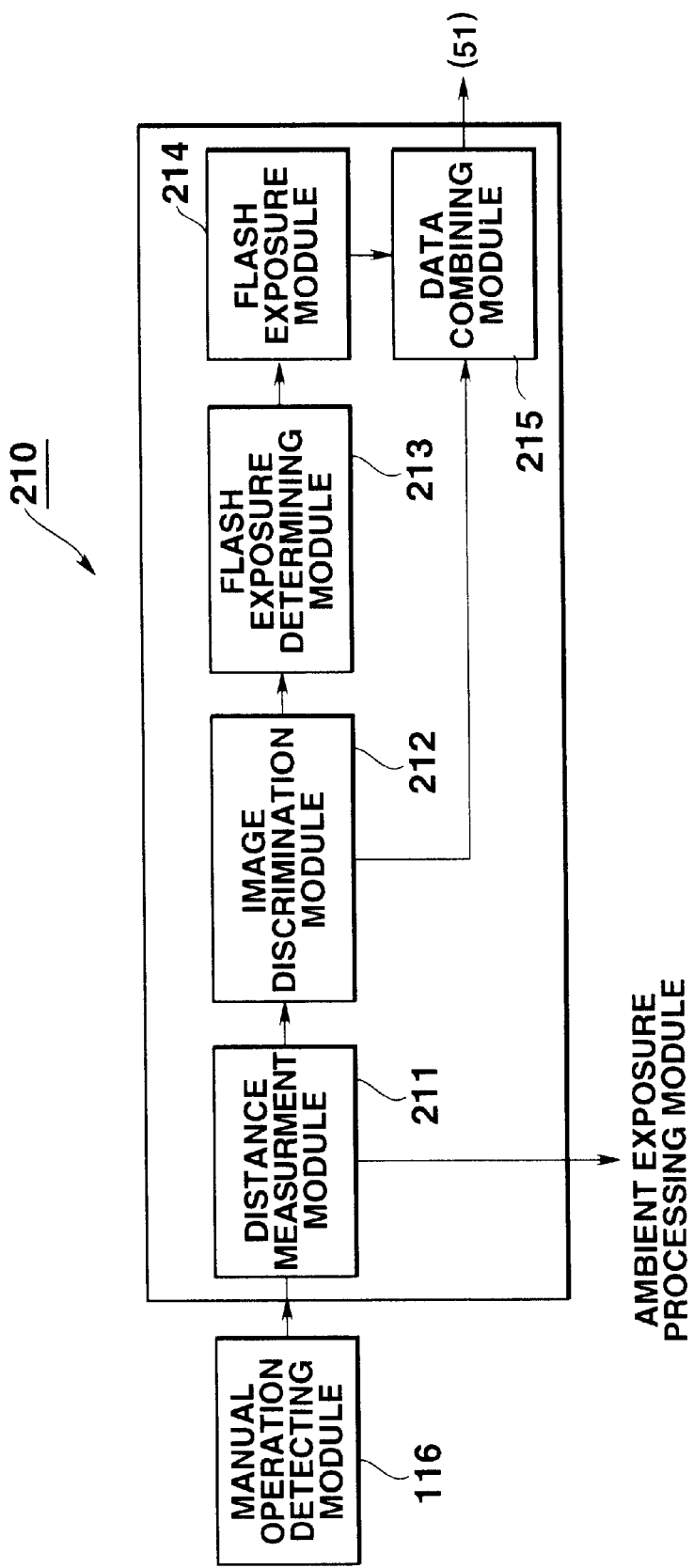
FIG. 15 is a diagram illustrating a structure of control program modules stored in a read only memory used in the digital camera in the forth embodiment.

FIG. 16 shows a flow chart for illustrating the operation of the camera in flash mode. FIG. 15 shows a diagram for illustrating a structure of program modules stored in ROM 23. When control section 20 detects the depression of flash setting button 36 (Step T1), control section 20 detects whether trigger button 37 is depressed by a half position of the full depression stroke (Step T2). When trigger button 37 is depressed by the half position, control section performs distance measurement module 211. In step T3, control section 20 controls auto-focus unit 103 and signal conversion section 12. Lens drive control unit 1033 of auto-focus unit 103 controls lens drive mechanism 1031 so that optical lens 101 moves from the infinity focus position to the closest focus position. CCD 121 provides electric signals for focus detection unit 1032 every time when lens 101 moves for predetermined distance. Focus detection unit 1032 detects whether an object each focus area is in focus based on the electric signals provided from CCD 121. When focus detection unit 1032 detects that the object in a certain focus area is in focus, focus detection unit 1032 reads out the lens position data from lens drive control unit 1033 and calculates distance between the camera and the object. The lens position data and distance data are provided from focus detection unit 1032 to control section 20. When optical lens 101 reaches to the closest focus position, control section 20 provide the lens position data representing a lens position at which the object in the central focus position 121a is focused for lens drive control unit 1033. Lens drive control unit 1033 controls lens drive mechanism 1031 so that optical lens 101 moves to the position corresponding to the lens position data provided from control section 20. In step T4, control section 20 performs the same operation as in step S2 of the first embodiment in order to determine whether the flash exposure is necessary based of the ambience brightness. In steps T4–T8, control section 20 performs image discrimination module 212. Control section 20 compares the distance data of the central focus area 121a with the distance data of surrounding focus areas 121b and calculates maximum distance Δx between the object in the central focus area 121a and the farthest object in the surrounding focus areas 121b (Step T5). In this case, when distance data represents infinity, control section 20 does not count the distance data in step T5. Control section 20 compares the maximum distance Δx with a predetermined value β (Step T6). When the maximum distance Δx is smaller than the predetermined value β, the second image flag is turned off (Step T8). That is, control section 20 determines that flash lighting for the object in the central focus area 121a covers the farthest object in the surrounding focus areas 121b. When the maximum distance Δx is larger than the predetermined value β, the second image flag is turned on (Step T7). Thereafter, the camera performs the same operation in steps T9–T21 as in steps S3 and S8–S19 of the camera in accordance with the first embodiment. However, in steps T10 and T15, control section 20 determines the flash power and duration of flash unit 11 based on the distance data of the object to the camera corresponding to the optimum exposures E1 and E2. That is, in step T10, control section 20 determined flash power and duration of flash unit 11 based on the distance data of the object in the central focus area 121*a*. In step T15, control section 20 determines the flash power and duration based on the distance data of the object in the surrounding focus area 121*b* in which the background peak level y2*a* is existed.

In the above embodiment, although auto-focus unit 103 measures distance of the object to the camera, other distance measuring device, such as an infra-red distance measuring device, a supersonic wave distance measuring device, etc. may be used for measuring distance of the object to the camera. In this case, it is preferable that the distance measuring devise measures distance of the object to flash unit 11.

In the embodiments set forth above, when the image data in the central area is written over the another image data in the background area, the image data in the central area is cut out based on the predetermined brightness value (y1*b*-α). However, the image data in the central area may be image data in a predetermined area corresponding to a central are of CCD 121 including an object to which the first flash exposure E1 is adjusted, such as central area focus area 121*a* shown in FIG. 14.

Although the embodiments set forth above illustrate the invention as applied to digital still cameras the present invention may be used in various devices other than digital still cameras.

What is claimed is:

1. An electronic camera for recording an image, comprising:

image sensing means for optically capturing such an image and providing electric signals representative of the captured image;

a flash unit for emitting flash light;

image discriminating means for discriminating between a first area and a second area in an image to be recorded based upon the electric signals provided by the image sensing means;

first exposure control means for determining a first flash exposure for the first area discriminated by the image discriminating means;

first exposure means including first flash exposure means for activating the flash unit and exposing the image to the image sensing means according to the first flash exposure determined by the first exposure control means;

first image data producing means for producing first image data based upon the electric signals provided by the image sensing means in response to the first flash exposure;

second exposure control means for determining a second exposure for the second area discriminated by the image discriminating means based upon the electric signals provided by the image sensing means in response to the first flash exposure;

second exposure means for exposing the image to the image sensing means according to the second exposure determined by the second exposure control means;

second image data producing means for producing second image data based upon the electric signals provided by the image sensing means in response to the second exposure; and combining means for combining at least part of the first image data produced by the first image data producing means and at least part of the second image data produced by the second image data producing means into an overall resultant image.

2. An electronic camera for recording an image as set forth in claim 1, wherein the second exposure control means determines a second flash exposure for the second area discriminated by the image discriminating means based upon the electric signals representative of the second area, which are provided by the image sensing means in response to the first flash exposure, and the second exposure means includes second flash exposure means for activating the flash unit and exposing the image to the image sensing means according to the second flash exposure determined by the second exposure control means.

3. An electronic camera for recording an image as set forth in claim 2, further comprising:

means for acquiring data regarding the brightness of the image in the second area as a result of the first flash exposure;

wherein the second exposure control means determines the second flash exposure for the second area based upon the brightness in the second area.

4. An electronic camera for recording an image as set forth in claim 1, further comprising:

means for acquiring data regarding the brightness of the image in the second area both prior to the first flash exposure and as a result of the first flash exposure;

wherein the second exposure control means determines a second flash exposure for the second area based upon the brightness data and the second exposure means includes second flash exposure means for activating the flash unit and exposing the image to the image sensing means according to the second flash exposure determined by the second exposure control means.

5. An electronic camera for recording an image as set forth in claim 4, wherein the second exposure control means determines a second flash exposure for the second area based at least in part upon the difference in the brightness of the second area prior to the first flash exposure and as a result of the first flash exposure.

6. An electronic camera for recording an image as set forth in claim 1, wherein the combining means includes means for extracting image data for the first area of the first image data produced by the first image data producing means, and means for combining the image data so extracted with at least part of the second image data produced by the second image data producing means.

7. An electronic camera for recording an image as set forth in claim 1, further comprising:

means for acquiring data regarding the brightness of the image in the first and second areas prior to the first flash exposure;

comparing means for comparing the brightness of the first area relative to that of the second area; and means for inhibiting the operation of the second exposure control means, the second exposure means and the second image data producing means based upon the result of the comparison made by the comparing means.

8. An electronic camera for recording an image as set forth in claim 1, further comprising:

first distance measuring means for measuring the distance between an object in the first area discriminated by the image discriminating means and the flash unit;

second distance measuring means for measuring the distance between an object in the second area discriminated by the image discriminating means and the flash unit;

comparing means for comparing the distances measured by the first and second distance measuring means; and means for inhibiting the operation of the second exposure control means, the second exposure means and the second image data producing means based upon the result of the comparison made by the comparing means.

9. An electronic camera for recording an image as set forth in claim 1, further comprising:

amplifier means for amplifying the electric signals provided by the image sensing means by an adjustable gain;

wherein the first exposure means includes means for adjusting the gain of the amplifier means corresponding to the first flash exposure determined by the first exposure control means, and the second exposure means includes means for adjusting the gain of the amplifier means corresponding to the second exposure determined by the second exposure control means.

10. A method of operating an electronic camera which has image sensing means for optically capturing an image and providing electric signals representative of the captured image and a flash unit for emitting flash light, the method comprising:

an image discriminating step for discriminating between a first area and a second area in an image to be recorded based upon the electric signals provided by the image sensing means;

a first exposure control step for determining a first flash exposure for the first area discriminated by the image discriminating step;

a first exposure step including a first flash exposure step for activating the flash unit and exposing the image to the image sensing means according to the first flash exposure determined by the first exposure control step;

a first image data producing step for producing first image data based upon the electric signals provided by the image sensing means in response to the first flash exposure;

a second exposure control step for determining a second exposure for the second area discriminated by the image discriminating step based upon the electric signals provided by the image sensing means in response to the first flash exposure;

a second exposure step for exposing the image to the image sensing means according to the second exposure determined by the second exposure control step;

a second image data producing step for producing second image data based upon the electric signals provided by the image sensing means in response to the second exposure; and a combining step for combining at least part of the first image data produced by the first image data producing step and at least part of the second image data produced by the second image data producing step into an overall resultant image.

11. A method of operating an electronic camera as set forth in claim 10, wherein the second exposure control step determines a second flash exposure for the second area discriminated by the image discriminating step based upon the electric signals representative of the second area, which are provided by the image sensing means in response to the first flash exposure, and the second exposure step includes a second flash exposure step for activating the flash unit and exposing the image to the image sensing means according to the second flash exposure determined by the second exposure control step.

12. A method of operating an electronic camera as set forth in claim 11, further comprising:

a step for acquiring data regarding the brightness of the image in the second area as a result of the first flash exposure;

wherein the second exposure control step determines the second flash exposure for the second area based upon the brightness in the second area.

13. A method of operating an electronic camera as set forth in claim 10, further comprising:

a step for acquiring data regarding the brightness of the image in the second area both prior to the first flash exposure and as a result of the first flash exposure;

wherein the second exposure control step determines a second flash exposure for the second area based upon the brightness data and the second exposure step includes a second flash exposure step for activating the flash unit and exposing the image to the image sensing means according to the second flash exposure determined by a second exposure control step.

14. A method of operating an electronic camera as set forth in claim 13, wherein the second exposure control step determines the second flash exposure for the second area based at least in part upon the difference in the brightness of the second area prior to the first flash exposure and as a result of the first flash exposure.

15. A method of operating an electronic camera as set forth in claim 10, wherein the combining step includes a step for extracting image data for the first area of the first image data produced by the first image data producing step, and a step for combining the image data so extracted with at least part of the second image data produced by the second image data producing step.

16. A method of operating an electronic camera as set forth in claim 10, further comprising:

a step for acquiring data regarding the brightness of the image in the first and second areas prior to the first flash exposure;

a comparing step for comparing the brightness of the first area relative to that of the second area; and a step for inhibiting the process of the second exposure control step, the second exposure step and the second image data producing step based upon the result of the comparison made by the comparing step.

17. A method of operating an electronic camera as set forth in claim 10, further comprising:

a first distance measuring step for measuring the distance between an object in the first area discriminated by the image discriminating step and the flash unit;

a second distance measuring step for measuring the distance between an object in the second area discriminated by the image discriminating step and the flash unit;

a comparing step for comparing the distances measured by the first and second distance measuring steps; and a step for inhibiting the operation of the second exposure control step, the second exposure step and the second image data producing step based upon the result of the comparison made by the comparing step.

18. An electronic camera for recording an image, comprising:
- image sensing means for optically capturing such an image and providing electric signals representative of the captured image;
- a flash unit for emitting flash light;
- image discriminating means for discriminating between a first area and a second area in an image to be recorded based upon the electric signals provided by the image sensing means;
- first exposure control means for determining a first flash exposure for the first area discriminated by the image discriminating means;
- first exposure means including first flash exposure means for activating the flash unit and exposing the image to the image sensing means according to the first flash exposure determined by the first exposure control means;
- first image data producing means for producing first image data based upon the electric signals provided by the image sensing means in response to the first flash exposure;
- means for acquiring data regarding the brightness of the image in the second area both prior to the first flash exposure and as a result of the first flash exposure;
- second exposure control means for determining a second flash exposure for the second area discriminated by the image discriminating means based at least in part upon the difference in the brightness of the second area prior to the first flash exposure and as a result of the first flash exposure;
- second exposure means including second flash exposure means for activating the flash unit and exposing the image to the image sensing means according to the second flash exposure determined by the second exposure control means; and
- second image data producing means for producing second image data based upon the electric signals provided by the image sensing means in response to the second exposure.

19. An electronic camera for recording an image, comprising:
- image sensing means for optically capturing such an image and providing electric signals representative of the captured image;
- a flash unit for emitting flash light;
- image discriminating means for discriminating between a first area and a second area in an image to be recorded based upon the electric signals provided by the image sensing means;
- first exposure control means for determining a first flash exposure for the first area discriminated by the image discriminating means;
- first exposure means including first flash exposure means for activating the flash unit and exposing the image to the image sensing means according to the first flash exposure determined by the first exposure control means;
- first image data producing means for producing first image data based upon the electric signals provided by the image sensing means in response to the first flash exposure;
- second exposure control means for determining a second exposure for the second area discriminated by the image discriminating means based upon the electric signals provided by the image sensing means in response to the first flash exposure;
- second exposure means for exposing the image to the image sensing means according to the second exposure determined by the second exposure control means;
- second image data producing means for producing second image data based upon the electric signals provided by the image sensing means in response to the second exposure;
- means for acquiring data regarding the brightness of the image in the first and second areas prior to the first flash exposure;
- comparing means for comparing the brightness of the first area relative to that of the second area; and
- means for inhibiting the operation of the second exposure control means, the second exposure means and the second image data producing means based upon the result of the comparison made by the comparing means.

20. An electronic camera for recording an image, comprising:
- image sensing means for optically capturing such an image and providing electric signals representative of the captured image;
- a flash unit for emitting flash light;
- image discriminating means for discriminating between a first area and a second area in an image to be recorded based upon the electric signals provided by the image sensing means;
- first exposure control means for determining a first flash exposure for the first area discriminated by the image discriminating means;
- first exposure means including first flash exposure means for activating the flash unit and exposing the image to the image sensing means according to the first flash exposure determined by the first exposure control means;
- first image data producing means for producing first image data based upon the electric signals provided by the image sensing means in response to the first flash exposure;
- second exposure control means for determining a second exposure for the second area discriminated by the image discriminating means based upon the electric signals provided by the image sensing means in response to the first flash exposure;
- second exposure means for exposing the image to the image sensing means according to the second exposure determined by the second exposure control means;
- second image data producing means for producing second image data based upon the electric signals provided by the image sensing means in response to the second exposure;
- first distance measuring means for measuring the distance between an object in the first area discriminated by the image discriminating means and the flash unit;
- second distance measuring means for measuring the distance between an object in the second area discriminated by the image discriminating means and the flash unit;
- comparing means for comparing the distances measured by the first and second distance measuring means; and
- means for inhibiting the operation of the second exposure control means, the second exposure means and the second image data producing means based upon the result of the comparison made by the comparing means.

21. A method of operating an electronic camera which has image sensing means for optically capturing an image and providing electric signals representative of the captured image and a flash unit for emitting flash light, the method comprising:

an image discriminating step for discriminating between a first area and a second area in an image to be recorded based upon the electric signals provided by the image sensing means;

a first exposure control step for determining a first flash exposure for the first area discriminated by the image discriminating step;

a first exposure step including a first flash exposure step for activating the flash unit and exposing the image to the image sensing means according to the first flash exposure determined by the first exposure control step;

a first image data producing step for producing first image data based upon the electric signals provided by the image sensing means in response to the first flash exposure;

a step for acquiring data regarding the brightness of the image in the second area both prior to the first flash exposure and as a result of the first flash exposure;

a second exposure control step for determining a second flash exposure for the second area discriminated by the image discriminating step based at least in part upon the difference in the brightness of the second area prior to the first flash exposure and as a result of the first flash exposure;

a second exposure step including a second flash exposure step for activating the flash unit and exposing the image to the image sensing means according to the second flash exposure determined by the second exposure control step; and a second image data producing step for producing second image data based upon the electric signals provided by the image sensing means in response to the second exposure.

22. A method of operating an electronic camera which has image sensing means for optically capturing an image and providing electric signals representative of the captured image and a flash unit for emitting flash light, the method comprising:

an image discriminating step for discriminating between a first area and a second area in an image to be recorded based upon the electric signals provided by the image sensing means;

a first exposure control step for determining a first flash exposure for the first area discriminated by the image discriminating step;

a first exposure step including a first flash exposure step for activating the flash unit and exposing the image to the image sensing means according to the first flash exposure determined by the first exposure control step;

a first image data producing step for producing first image data based upon the electric signals provided by the image sensing means in response to the first flash exposure;

a second exposure control step for determining a second exposure for the second area discriminated by the image discriminating step based upon the electric signals provided by the image sensing means in response to the first flash exposure;

a second exposure step for exposing the image to the image sensing means according to the second exposure determined by the second exposure control step;

a second image data producing step for producing second image data based upon the electric signals provided by the image sensing means in response to the second exposure;

a step for acquiring data regarding the brightness of the image in the first and second areas prior to the first flash exposure;

a comparing step for comparing the brightness of the first area relative to that of the second area; and a step for inhibiting the process of the second exposure control step, the second exposure step and the second image data producing step based upon the result of the comparison made by the comparing step.

23. A method of operating an electronic camera which has image sensing means for optically capturing an image and providing electric signals representative of the captured image and a flash unit for emitting flash light, the method comprising:

an image discriminating step for discriminating between a first area and a second area in an image to be recorded based upon the electric signals provided by the image sensing means;

a first exposure control step for determining a first flash exposure for the first area discriminated by the image discriminating step;

a first exposure step including a first flash exposure step for activating the flash unit and exposing the image to the image sensing means according to the first flash exposure determined by the first exposure control step;

a first image data producing step for producing first image data based upon the electric signals provided by the image sensing means in response to the first flash exposure;

a second exposure control step for determining a second exposure for the second area discriminated by the image discriminating step based upon the electric signals provided by the image sensing means in response to the first flash exposure;

a second exposure step for exposing the image to the image sensing means according to the second exposure determined by the second exposure control step;

a second image data producing step for producing second image data based upon the electric signals provided by the image sensing means in response to the second exposure;

a first distance measuring step for measuring the distance between an object in the first area discriminated by the image discriminating step and the flash unit;

a second distance measuring step for measuring the distance between an object in the second area discriminated by the image discriminating step and the flash unit;

a comparing step for comparing the distances measured by the first and second distance measuring steps; and a step for inhibiting the operation of the second exposure control step, the second exposure step and the second image data producing step based upon the result of the comparison made by the comparing step.

* * * * *